Figure 1:
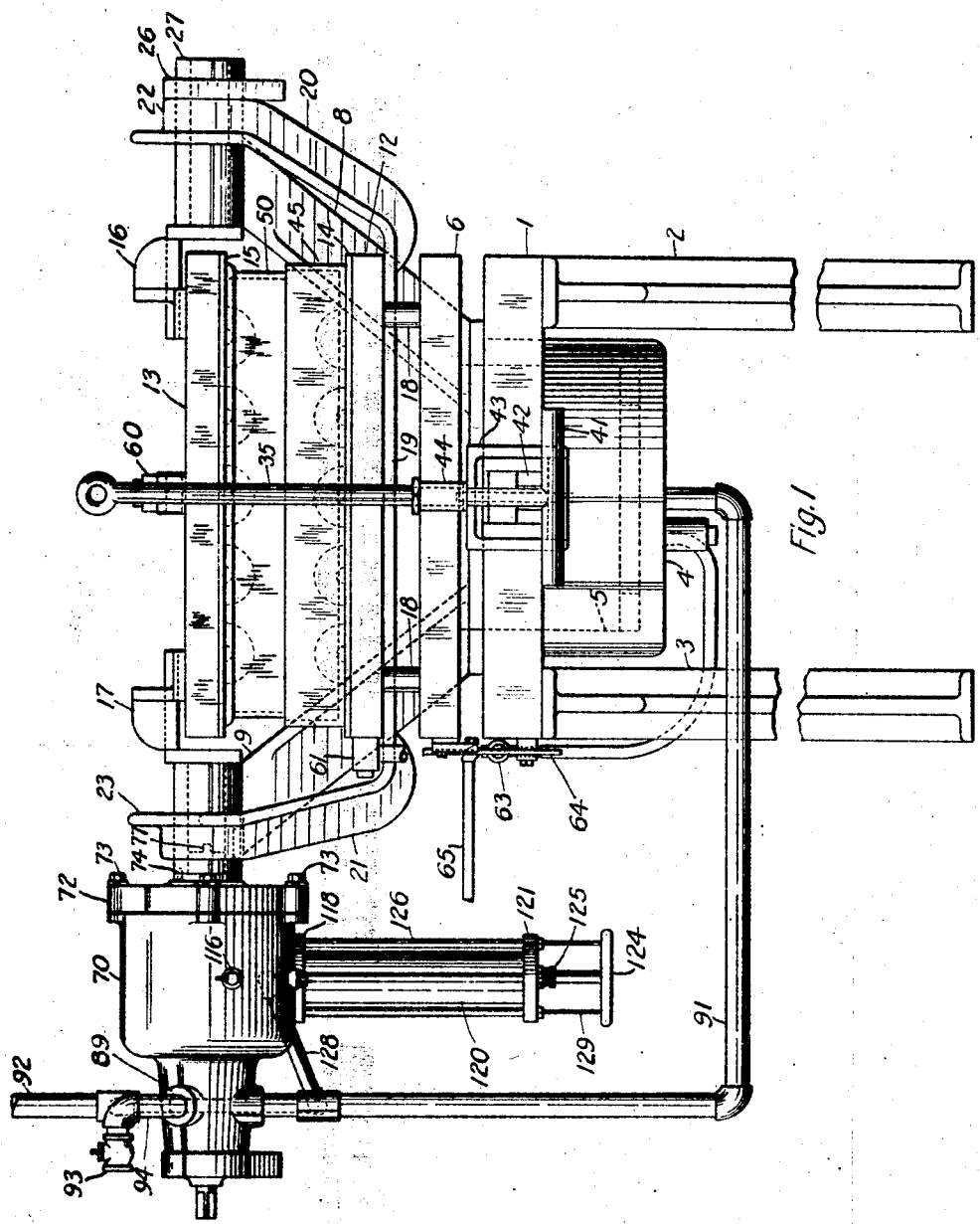

Oct. 13, 1925.

P. S. MENOUGH 1,557,306

MOLDING MACHINE

Filed May 18, 1921

7 Sheets-Sheet 1

WITNESSES

INVENTOR
Paul S. Menough
BY
ATTORNEY

Oct. 13, 1925.
P. S. MENOUGH
1,557,306
MOLDING MACHINE
Filed May 18, 1921
7 Sheets-Sheet 3
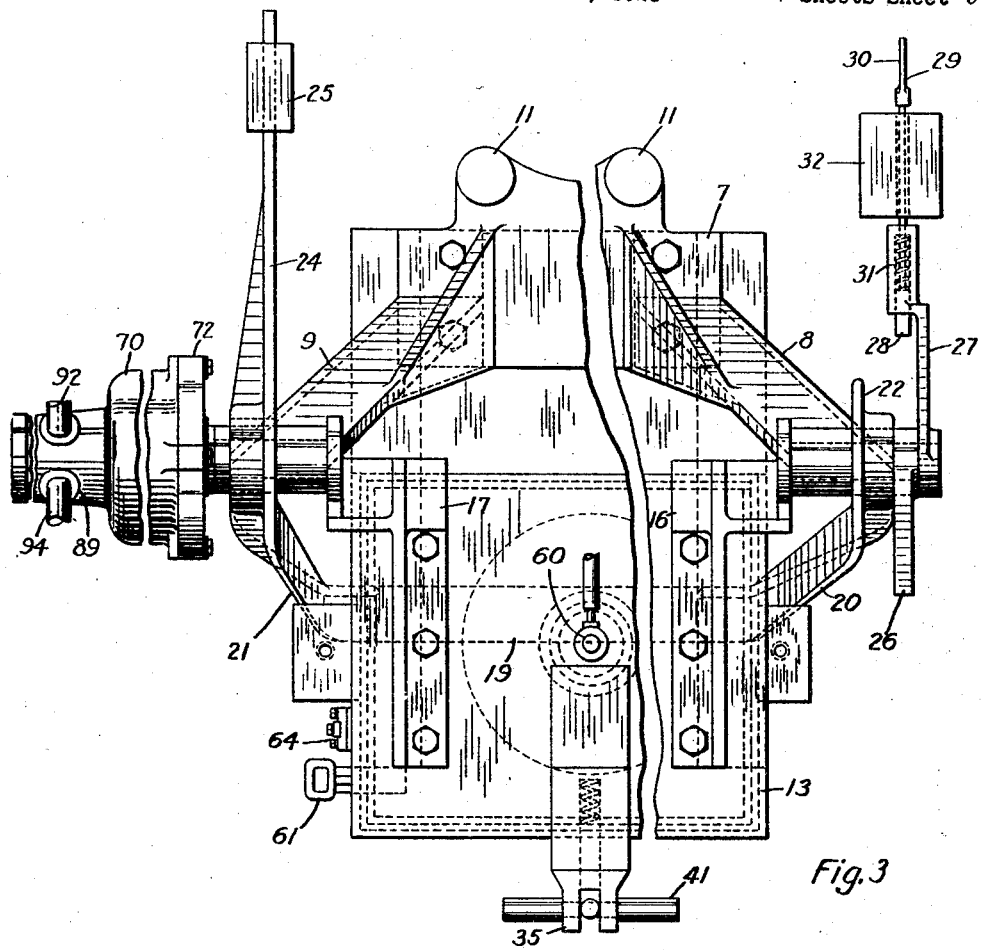
Fig. 3
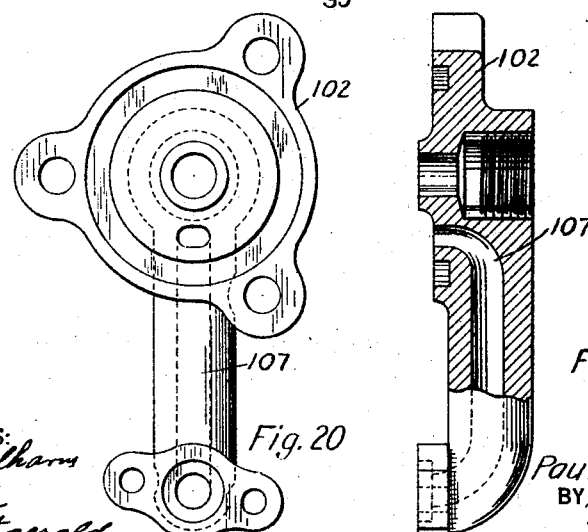
Fig. 20
Fig. 21
WITNESSES:
INVENTOR
Paul S. Menough
BY
ATTORNEY Oct. 13, 1925.
P. S. MENOUGH
1,557,306
MOLDING MACHINE
Filed May 18, 1921
7 Sheets-Sheet 4
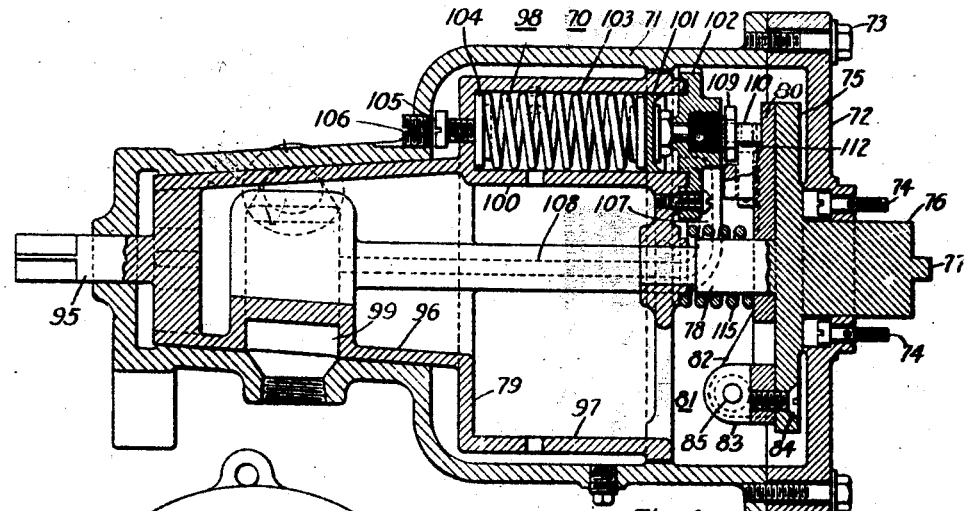
INVENTOR
Paul S. Menough
BY Wayne B Wells
ATTORNEY

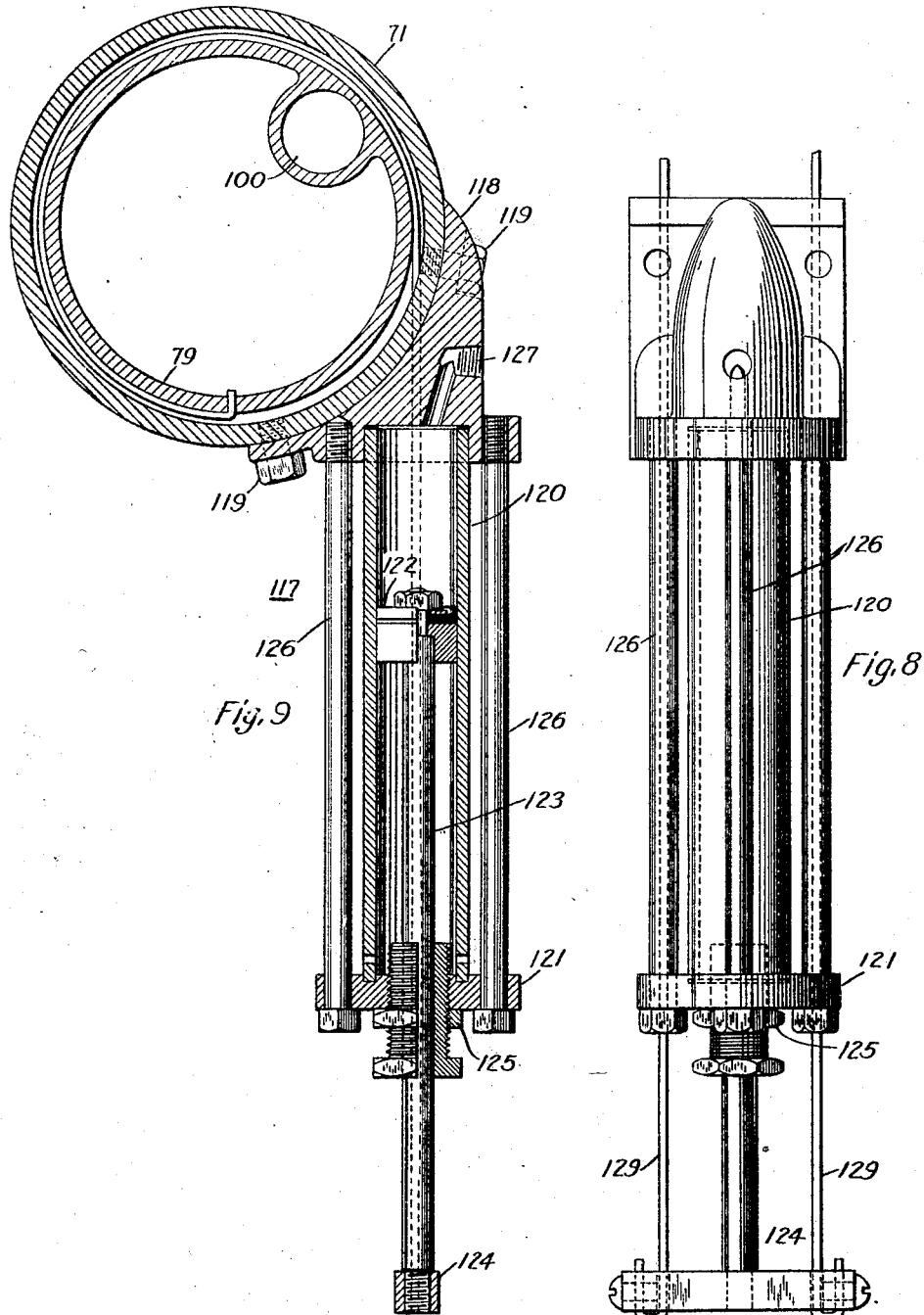

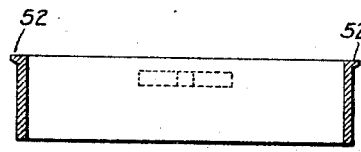
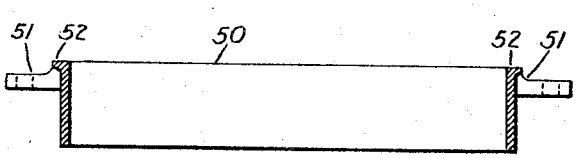
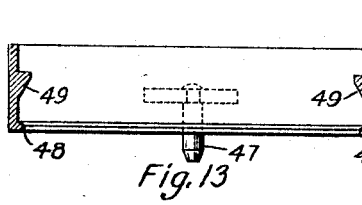
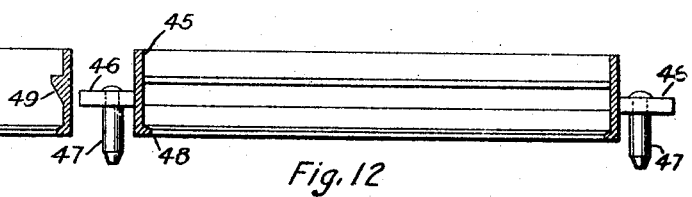
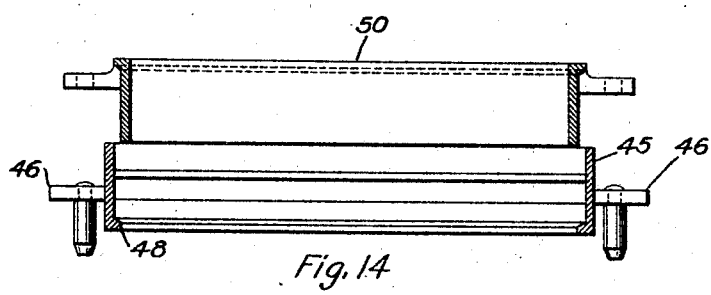

Oct. 13, 1925.

P. S. MENOUGH.

MOLDING MACHINE

Filed May 18, 1921

1,557,306

7 Sheets-Sheet 7

WITNESSES:

INVENTOR
Paul S. Menough
BY Wayne B Wells
ATTORNEY

Patented Oct. 13, 1925.

1,557,306

UNITED STATES PATENT OFFICE.

PAUL S. MENOUGH, OF BRIDGEPORT, CONNECTICUT.

MOLDING MACHINE.

Application filed May 18, 1921. Serial No. 470,535.

*To all whom it may concern:*

Be it known that I, PAUL S. MENOUGH, a citizen of the United States, and a resident of Bridgeport, in the county of Fairfield and State of Connecticut, have invented a new and useful Improvement in Molding Machines, of which the following is a specification.

My invention relates to molding machines and, particularly, to fluid-pressure operated molding machines.

One object of my invention is to provide a molding machine that shall form an impression on the top and the bottom part of a flask, that shall automatically limit the pressure applied to the flask, and that shall automatically relieve the flask of the pressure applied thereto in such manner as to prevent injury to the mold.

Another object of my invention is to provide a molding machine that shall form an impression on the top and the bottom part of a flask in such manner as to permit the assembling of any desired number of flasks, one upon the other, for multiple molding.

Another object of my invention is to provide a molding machine having a main fluid valve that shall automatically control the admission and the exhaust of fluid pressure to and from the main pressure cylinder of the machine.

Another object of my invention is to provide a molding machine of the above-indicated character that shall be provided with an auxiliary fluid-operated device for returning the main valve to initial position when a predetermined fluid pressure has been supplied to the main pressure cylinder of the machine.

Another object of my invention is to provide a molding machine of the above-indicated character that shall have a top and a bottom pattern plate that are rotatably mounted on the same axis of rotation and that shall be provided with a two-part telescoping flask to be compressed between said plates.

In the fluid-pressure operated molding machines now in service, only a single impression is formed in the sand of the flasks upon each operation of the machine. The flasks cannot be mounted one upon the other for efficient multiple molding and the fluid pressure applied to the machine is in no way automatically controlled. Moreover, no means is provided for automatically controlling the pressure applied to the machine in forming an impression in the sand and no means is provided for controlling the rate at which the fluid pressure on the machine is relieved. Furthermore, no means is provided for automatically controlling the operation of the vibrators which act on the machine.

In a molding machine constructed in accordance with my invention, a two-part telescoping flask is employed and a top and a bottom plate is provided for forming an impression in the top and the bottom of the flask for each operation of the machine. Moreover, the flasks can be mounted, one upon the other, for efficient multiple molding. An automatic valve is provided for controlling the admission and the exhaust of the fluid pressure for forming impressions in the sand on the top and the bottom part of the flask. Moreover, automatic means are provided for limiting the pressure applied to the sand in the flask, for controlling the rate of relieving the sand in the flask from pressure, for holding the mold at an exact right angle with the top pattern plate as the mold is dropped away from the aforesaid plate after the pattern impression is made in the mold, for controlling the rate of withdrawal of the mold from the top plate to insure the withdrawal of the mold from the pattern plate without tearing the mold, and for returning the various control parts to initial position.

The molding machine constructed in accordance with my invention comprises a top and a bottom pattern plate. The two pattern plates are suitably mounted on supporting pattern base plates and are adapted to be rotated on the same axis of rotation. The flask which co-operates with the two pattern plates comprises two members which are adapted to telescope, one within the other, when the sand in the flask is being compressed between the top and the bottom pattern plates. The flasks are provided with inwardly projecting parts for preventing crushing of the molds when the flasks are mounted one upon the other for multiple molding and are provided with outwardly projecting parts for permitting the mounting of the flasks one upon the other.

A main pressure cylinder is preferably located below the bottom pattern plate for compressing the sand in the flask between the top and the bottom pattern plates. During compression, the depth of the flask varies to maintain the base of the impressions formed in the bottom and the top of the flask level with the top and the bottom edge of the flask. A main valve is provided for controlling the admission and the exhaust of the fluid pressure to and from such main pressure cylinder. The main valve is provided with a plug which is rotated in accordance with the position of the top pattern plate. When the top pattern plate is rotated into position above the bottom pattern plate, the main valve is operated for admitting fluid pressure to the main pressure cylinder to compress the sand in the flask between the two pattern plates.

The two pattern plates are initially located about 180 degrees from each other and one part of the flask, filled with sand, is mounted on each pattern plate. The two pattern plates are rotated through approximately 90 degrees to join the two parts of the flask and then the two pattern plates and the two parts of the flask are jointly rotated to a horizontal position. If so desired, the bottom pattern plate and the flask part mounted upon it may be maintained in a horizontal position and the top pattern plate and the flask part mounted on it may be rotated through approximately 180 degrees into position.

A fluid-pressure device is provided for exerting a force tending to move the main valve plug to an initial position and automatic means is provided for releasing the valve plug from the top pattern plate when a predetermined fluid pressure has been supplied to the main pressure cylinder. Upon release of the valve plug, it is returned to initial position by the above-mentioned fluid-pressure device. When the valve plug is returned to initial position, the fluid pressure is released or exhausted from the main pressure cylinder. The fluid-pressure device which returns the valve plug to initial position is controlled by the fluid pressure which is supplied to the main pressure cylinder.

An auxiliary exhaust valve is connected to the main valve for permitting a rapid exhaust of the fluid pressure from the main pressure cylinder until a predetermined fluid pressure is obtained in such cylinder. The auxiliary valve then relieves the main pressure cylinder of fluid pressure at a much slower rate to prevent injury to the impression formed in the sand of the flask.

A vibrator, or vibrators, is mounted upon either or both the top and the bottom pattern plate for loosening the plates from the sand after an impression is formed. A vibrator valve, which is mounted on the base plate of the machine, is connected to the supply of fluid pressure and is operated by a trip bar on the plunger plate. Such vibrator valve serves to admit fluid pressure to the vibrators when a predetermined fluid pressure has been applied to the machine. Thus, when a predetermined fluid pressure has been applied to the machine, the plunger plate is raised above the base plate and the trip lever opens the vibrator valve and operates the vibrators. The above mentioned vibrator, particularly the one mounted on the bottom plate, may be operated through a vibrator valve, as described above, said valve being mounted on the base plate and opened by pressure on a suitable hinged plate, said pressure being exerted and maintained by the knee of the operator, during the time the operator is manually lifting the flask containing the completed mold from the bottom plate.

Figure 2:
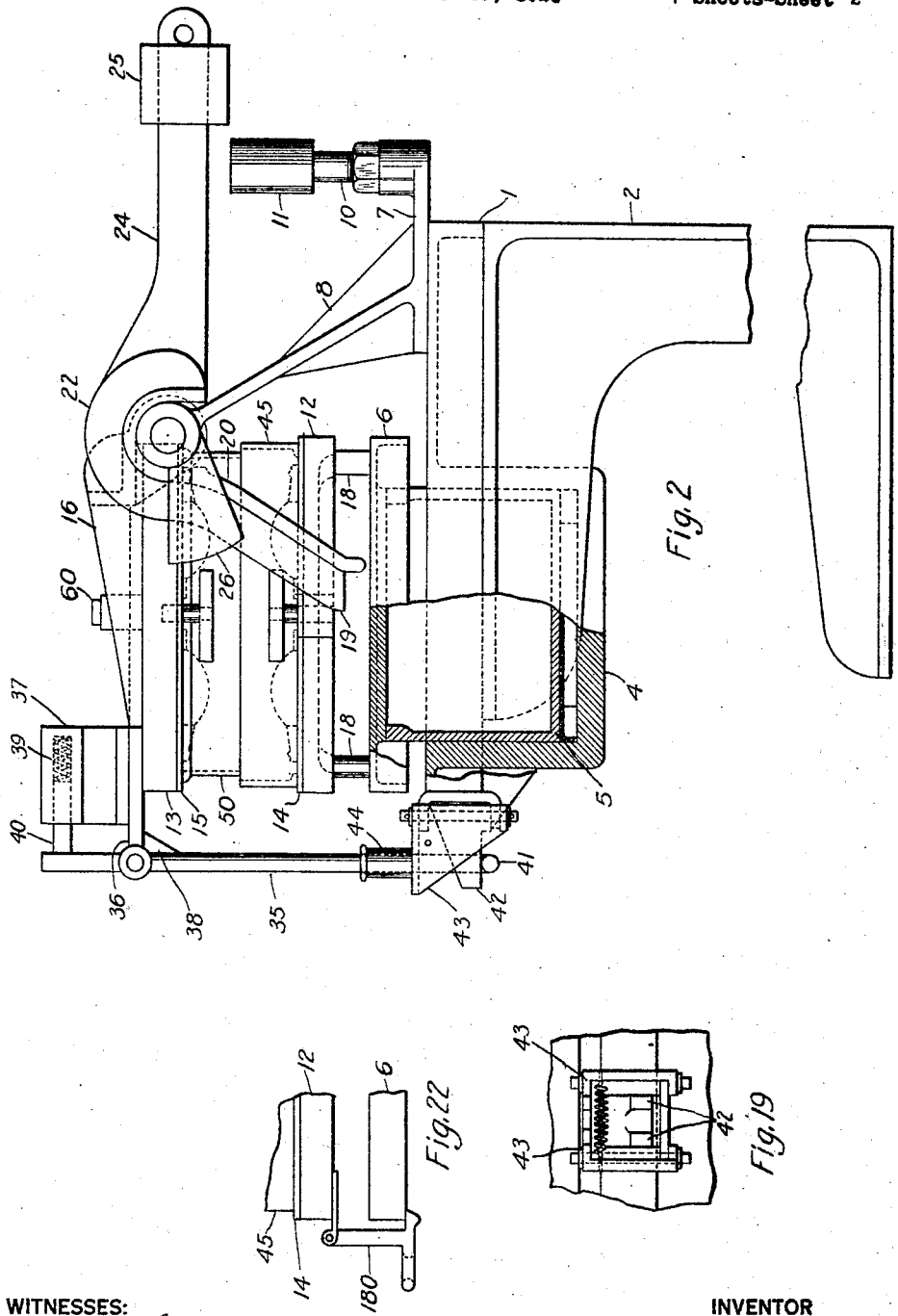
Figure 15:
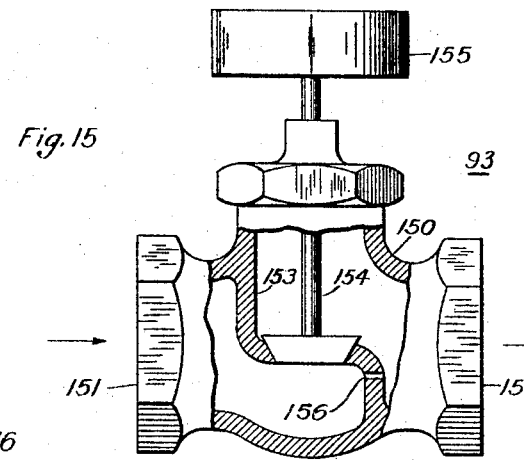
Figure 16:
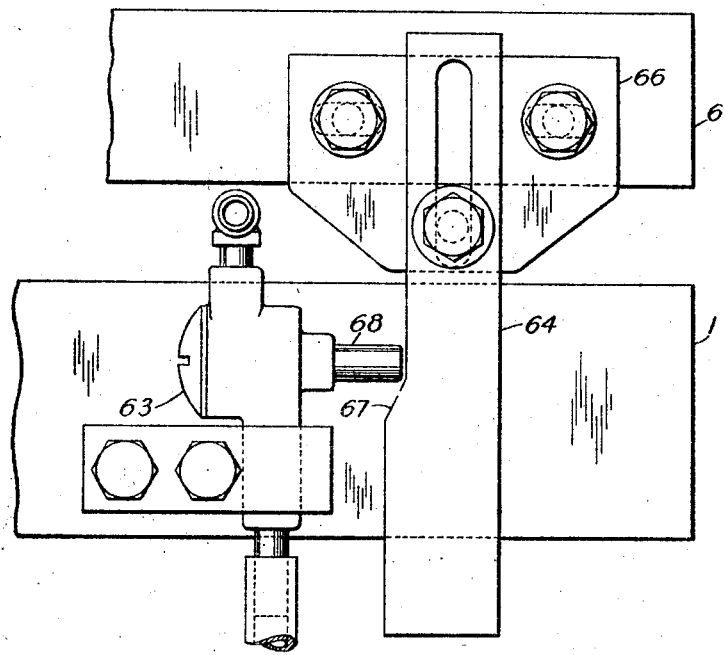
Figure 17:
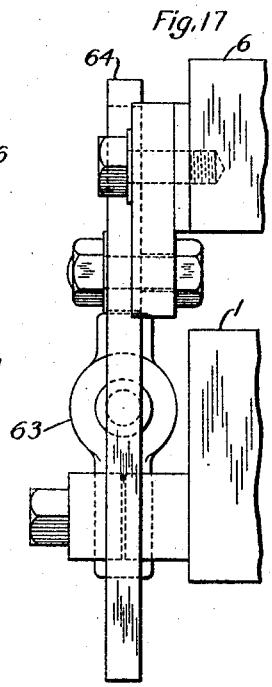
Figure 18:
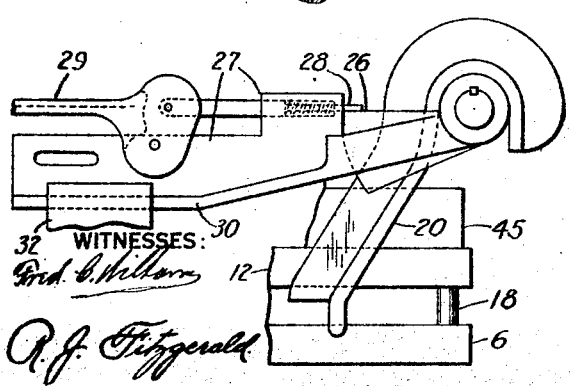

In the accompanying drawings, Figure 1 is a front elevational view of a molding machine constructed in accordance with my invention, and Figs. 2 and 3 are, respectively, side elevational and plan views of the molding machine shown in Fig. 1; Fig. 4 is a sectional view of the main valve for controlling the operation of the machine; Figs. 5 and 6 are end views of the main valve detached from the molding machine, in Fig. 5, the contact and the adjusting disk have been removed, and Fig. 7 is a view of the main valve looking in the direction of the machine. Fig. 8 is an elevational view of the fluid-pressure device which automatically effects the return of the main valve to initial position, and Fig. 9 is a sectional view of the fluid-pressure device shown in Fig. 8; Figs. 10 and 11 are sectional views of the top part of the telescoping flask, and Figs. 12 and 13 are sectional views of the bottom part of the telescoping flask; Fig. 14 is a sectional view showing the two parts of the flask in position. Fig. 15 is a detail view of the auxiliary exhaust valve, and Figs. 16 and 17 are detail views of the vibrator valve and the trip bar for operating such valve. Fig. 18 is a side view of the lever which is connected to the top pattern plate; Fig. 19 is a detail view of the guide plate and catch for the fulcrum lever. Figs. 20 and 21 are views of the cap which is mounted on the main valve plug; and Fig. 22 is a view of the latch between the bottom pattern base plate and the piston plate.

Referring to the accompanying drawings, and particularly to Figs. 1, 2 and 3, a base plate 1 is mounted upon two U-shaped legs 2 and 3. The base plate 1 and the two legs 2 and 3 may be composed of any suitable material and are preferably composed of cast iron. The base plate 1 is attached to the legs 2 and 3 in any convenient manner, A main pressure cylinder 4 is preferably cast integral with the base plate 1 and operates a piston 5 which is preferably cast integral with the piston plate 6.

A bracket 7 is mounted on the rear of the base plate 1 and has two arms 8 and 9 which extend upwardly for a purpose to be hereinafter set forth. To the rear of the bracket 7 are mounted two studs 10 which carry two buffers 11 for a purpose to be hereinafter set forth. If so desired, the two buffers 11 may be resiliently mounted upon the two bolts 10.

A bottom pattern base plate 12 and a top pattern base plate 13 are located above the piston plate 6. The bottom pattern base plate 12 carries, and has attached to it, in any suitable manner, a pattern plate 14, formed according to the impression to be obtained in the sand of the flask and the top pattern base plate carries, and has attached to it, in any suitable manner, a pattern plate 15 formed in accordance with the impression desired to be obtained in the top part of the flask. The plates 12 and 13 are preferably composed of cast iron and the plates 14 and 15 are composed of aluminum, brass, cast iron, or any suitable material. Two trunnions 16 and 17 are connected to the top pattern plate 13 in any suitable manner and have bearings in the arms 8 and 9 of the bracket 7. The trunnion 16 extends somewhat beyond the arm 8 for a purpose to be hereinafter set forth.

The bottom pattern plate 12 is supported on the piston plate 6 by means of studs 18 and is rigidly connected to a rocker arm 19. The rocker arm 19 extends under the pattern base plate 12 and has two arms 20 and 21. The arm 20 is provided with a yoke 22 which rests upon the upper portion of the arm 8 of the bracket 7. The arm 21 is provided with a yoke portion 23, which rotates on the upper portion of the arm 9, and an extended portion 24, which carries a weight 25. The weight 25 serves to balance a portion of the weight of the flask, mold and bottom pattern plate 12.

The arm 8 of the bracket 7 has a catch 26 cast integral with it. A lever 27 is mounted on the trunnion 16 outside the arm 8 and is provided with a latch 28, which co-operates with the catch 26. The latch 28 is operated by a trigger 29 which is pivotally mounted on a handle 30 that is attached to the lever 27. The latch is normally maintained in the position shown in Fig. 3 by means of a spring member 31. A weight member 32 is mounted upon the lever 27 for balancing a portion of the weight of the flask, mold and top pattern plate 13.

Referring to Fig. 18, the lever 27 is shown in position for holding the top pattern plate 13 against the two buffers 11. The latch 28 engages the top portion of the catch 26 and movement of the top pattern plate is prevented until the latch is released by the trigger 29. The spring 31 maintains the latch 28 in such position.

A fulcrum lever 35 is provided for holding the top pattern plate 13 in position during the pressing operation. The lever 35 is pivotally mounted upon a bar 36, which is rigidly attached to pattern plate 13, and the fulcrum block 37 is mounted upon this bar 36. A projection 38, which is preferably cast integral with the lever 35, is held in engagement with the projection 36 by a spring member 39 acting on a rod 40. The rod 40 impinges on the end of the lever 35. The spring member 39 is disposed within the fulcrum block 37. The lower portion of the fulcrum lever 35 is provided with a T-shaped latch 41, which is adapted to engage a catch 42, as shown in Figs. 19 and 2 of the drawing. Two spring-actuated guide plates 43 are provided for guiding the T-shaped latch 41 into position below the catch 42. The guide plates 43 close underneath a sleeve 44 to hold the top pattern plate in the position shown when the mold is dropped away from it. The catch 42 and the guide plates 43 are mounted on the base plate 1. The sleeve 44 is provided on the fulcrum lever 35 for adjusting the position of the T-shaped catch 41, and, as described above, for maintaining the top pattern plate in a horizontal position.

Referring to Figs. 10 to 14 inclusive, the flask which is used in connection with the machine is illustrated in detail. The bottom portion 45 of the flask is provided with projections 46 having guide pins 47 which engage the bottom pattern plate for preventing lateral movement of the flask. A sand strip 48 is formed around the inside edge of the bottom part of the flask, as shown in Figs. 12, 13 and 14. The sides of the bottom part of the flasks are provided with projections 49 which serve to prevent crushing of the molds during multiple molding when a number of flasks are piled one upon another. The inside dimensions of the top part of the bottom portion 45 of the flask is wider than outside dimensions of the bottom part of the top portion 50 of the flask in order to permit the telescoping of such flask part 45 with the flask part 50.

The top portion 50 of the flask is provided with projections 51 for the insertion of guide pins during multiple molding. A bearing strip 52 is provided around the top outside edge of the flask part 51 which overlaps the sand strip 48 that is formed in the bottom part of the flask. The bearing strip 52 and the sand strip 48 permit the piling of a number of flasks one upon the other for multiple molding. The telescoping feature of the flask is shown in Fig. 14 of the drawing. By providing a telescoping flask, it is possible to form an impression along the top edge and the bottom edge of the flask. The depth of the flask is so varied as to maintain the base of the impressions formed in the sand even with the top and the bottom edge of the flask.

The bottom portion 45 of the flask is mounted upon the pattern plate 12 and the top portion 50 of the flask is mounted upon the top pattern plate 13. Guide pins are provided for holding the two parts of the flask in position, as shown. From the description so far given, it is clear the top pattern plate 13 and the top flask member 50 may be rotated with the trunnions 16 and 17 on the arms 8 and 9 of the bracket 7. The rotation of such members is not only controlled by the lever 27, but, also, by the fulcrum lever 35. When the lever 27 is in the position shown in Fig. 18, the pattern plate 13 is 180° out of position and is resting upon the buffers 11. Springs may be provided in the buffers 11 for resiliently holding the various parts in such position, but, preferably, the resiliency of the various connections and, chiefly, the tortion of the trunnion members 16 and 17 is utilized to resiliently hold the plate 13 against the buffers 11.

The bottom pattern plate, which is mounted upon the rocker arm 19, is rotated about the same axis as the top pattern plate 13 by reason of having the yoke portions of the rocker arm mounted upon the trunnions 16 and 17. The rocker arm 19 is so mounted upon the trunnions 16 and 17 as to permit the raising of the piston plate 6 and the bottom plate 12 during the squeezing operation.

A vibrator 60 is mounted on the top pattern plate 13 and a vibrator 61 is mounted on the bottom pattern plate 14. The vibrator 60 is connected to a vibrator valve 63, which is controlled by a trip bar 64 that is mounted upon the piston plate 6. The vibrator 61 is also connected to the vibrator valve 63. The vibrator valve 63 is mounted upon the base plate 1 and is connected to the fluid-pressure pipe 65. A guide plate 66, which is bolted to the piston plate 6, is connected to the trip bar 64 by a bolt-and-slot connection, as shown in Figs. 16 and 17 of the drawing. By means of such connection, it is possible to predetermine the point in the operation of the machine that the vibrator or vibrators will commence operation.

The trip bar 64 is provided with a cam surface 67 which engages the operating pin 68 of the vibrator valve when the piston plate is raised a predetermined value. Thus, when fluid pressure is admitted to the main cylinder 4 and the piston plate 6 is raised to squeeze the mold and form an impression in the top and the bottom part of the flask, the trip bar 64 operates the valve 63 for supplying fluid pressure to the two vibrators 60 and 61. A main valve 70 is provided for controlling the admission and the exhaust of the fluid pressure to and from the main cylinder 4. Such valve is controlled in accordance with the position of the top pattern plate 13 in a manner to be hereinafter set forth.

Referring to Figs. 4, 5, 6, 7, 20 and 21 of the drawing, the main valve comprises a casing 71 which is attached to a base plate 72 by means of bolts 73. The base plate 72 is attached to the arm 9 by means of the screws 74 or may be cast integral therewith. Thus, the valve casing 71 and the base plate 72 are maintained stationary.

A trunnion contact disc 75 is disposed adjacent to the base plate 72 and is provided with a projecting cylindrical portion 76, which extends through the base plate 72. A key 77 is formed in the projection 76 for engaging a slot formed in the end portion of the trunnion 17. The contact disc 75 is thus connected to the top pattern plate 13 and rotated in accordance with the rotation of such pattern plate. The contact disc 75 is provided with a second cylindrical projecting portion 78, which extends into one end of a valve plug 79.

A valve-adjusting disc 80 is mounted on the projection 78 adjacent to the disc 75 and is provided with a mechanism 81 for adjusting the position of the adjusting disc relative to the contact disc 75.

The adjusting mechanism 81 comprises two arms 82, which project from the adjusting disc 80, and a block 83, which it attached to the contact disc 75 by means of a screw 84. The adjusting disc 80 is cut away, as shown in Fig. 6, in order to permit the mounting of the block 83 between the two arms 82. A threaded bolt 85, which is loosely mounted in the arms 82, is threadably connected to a nut 86, that is disposed between the bifurcated end portions of the block 83. The loose connection of the bolt 85 to the arms 82 is shown in Fig. 6 of the drawings. Upon turning the screw-bolt 85, the position of the contact disc relative to the adjusting disc is changed by the movement of the nut 86 along the bolt. Preferably, an opening is formed in the casing 71 of the valve 70 in order that the screw-bolt 85 may be operated for adjusting the valve without dismantling such valve. A nut 87 is attached to the bolt 85 in any convenient manner, in order to maintain such bolt in position.

The main valve 70 is provided with an inlet port 88, an exhaust port 89, and a port 90, which is connected, by a pipe 91, to the main cylinder. The inlet port 88 is connected by a pipe 92 to a source of fluid pressure and the exhaust port 89 is connected to an auxiliary exhaust valve 93, by means of a pipe 94, The valve plug 79 is preferably composed of brass and is provided with a cylindrical projection 95, which has a bearing in one end of the casing 71, as shown in Fig. 4 of the drawings. The plug 79 comprises a tapered section 96, which fits closely with the casing 71, and an enlarged portion 97, which carries a pressure-adjusting device 98.

The tapered portion 96 is provided with an air passage 99, which connects the port 90 either with the exhaust port 89 or the inlet port 88. In the position of the valve shown in Figs. 4 and 7 of the drawings, the port 90 is connected to the inlet port 88. Upon operation of the plug 79 through 120° in a counter-clockwise direction, the port 90 is connected to the exhaust port 89. In brief, this portion of the main valve operates in the same manner as an ordinary three-way valve.

The pressure-adjusting device 98, which is mounted in the enlarged portion 97 of the plug 79, comprises a cylinder 100, which is preferably formed integral with the valve plug 79. A piston 101, which operates within the cylinder 100, is normally forced into engagement with a cap 102, by means of a spring member 103. A wedge member 104, which is disposed between the spring member and the lower end of the cylinder 100, is operated by a bolt 105 for adjusting the tension of the spring member 103. A tapped hole 106 is provided in the casing 71 of the valve for permitting the adjusting of the bolt 105 without dismantling the valve.

The cap 102, which is mounted upon the plug 79 of the valve, not only covers the end of the cylinder 100 but also serves to connect such cylinder, by a channel 107, to a fluid conduit 108, which connects with the fluid conduit 99 in the plug of the valve.

A packing nut 109, is mounted on the cap 102, centrally with the cylinder 100, and a pin 110, which is attached to the piston 101 in any suitable manner, projects through the packing nut 109 for a purpose to be hereinafter set forth.

A lug 111, which is mounted upon the valve-adjusting disc 80, carries a latch bolt 112, which cooperates with the pin 110. The latch bolt 112 is slidably mounted in the lug 111 and is normally forced to an extended position, as shown in Fig. 6, by means of a spring member 113. The spring member 113, passing through the latch bolt, serves to limit its movement. A spring member 115 is provided between the adjusting disk 80 and the plug 97, as shown in Fig. 4 of the drawing, for maintaining the plug in position within the casing 71. Preferably, the casing 71 is filled with oil to the level of a tap 116, as shown in Figs. 1 and 7 of the drawings.

Referring to Figs. 8 and 9 of the drawing, a fluid-operated device 117 is provided for returning the valve plug 79 to initial or exhaust position after operation of the main pressure cylinder 4. The device 117 comprises a block 118, of any suitable material, which is fastened to the valve casing 71 by means of bolts 119. However, if so desired, the block 118 may be cast integral with the casing 71. A cylinder 120, which is preferably composed of brass, is disposed between the block 118 and a cap member 121. A piston 122, which operates within the cylinder 120, is connected to a piston rod 123, which projects through the cap 121 and which is connected to a cross head 124 in any suitable manner. A packing box 125, of any suitable type, is mounted in the cap 121 for maintaining the cylinder 120 airtight. Four hollow rods 126 are disposed between the block 118 and the cap 121 for holding the cylinder 120 between such members.

The cylinder 120 is connected to a port 127 in the block 118. The port 127 is connected, by a pipe 128, to the pipe 91, which is connected to the main-pressure cylinder 4. Thus, the cylinder 120 is supplied with fluid pressure in accordance with the operation of the main pressure cylinder.

Two steel cables 129, which are connected to the cross head 124, as shown in Fig. 8 of the drawing, pass through two of the rods 126 and through the block 118 and the casing 71 to the inside part of the valve 71. Such cables are connected to the plug 79 in any suitable manner, as shown in Fig. 9 of the drawing. Thus, it is apparent the piston 122 is directly connected to the plug 79 and is operated in accordance with the rotation of such plug.

In Figs. 4 and 7 of the drawing, the plug 79 of the valve is shown in the position for permitting fluid pressure to flow to the main cylinder 4. In such position of the main valve, the pin 110 of the pressure-adjusting device is located vertically above the axis of rotation of the valve. In the exhaust position of the main valve, the pin 110 will be located 120°, in a clockwise direction, from the position shown in Figs. 4 and 7.

When the top pattern base plate 13 is resting upon buffers 11 and such plate is rotated on the trunnions to place the two parts of the flask in position for forming an impression in the sand contained in such molds, the pattern base plate, the trunnions, and the plates 75 and 80 pass first through 60° before any effect is produced on the main valve 70. When a rotation of 60° has been effected, the latch bolt 112, which is mounted on the adjusting disc 80, engages the pin 110, as shown in Fig. 6 of the drawing, and the valve plug 79 is rotated with the pattern plate 13. The inlet port 88 is not connected to the cylinder 4 through the port 90 until the top pattern plate has rotated approximately through 180° and the fulcrum lever 35 is held in position, shown in Fig. 2, by the catch 42. Upon such rotation of the valve plug in a clockwise direction, fluid pressure is admitted to the cylinder 120 of the fluid pressure device 117 for exerting a force tending to move the valve plug to the initial or the exhaust position.

When a predetermined fluid pressure has been supplied to the cylinder 4, a similar pressure is supplied to the pressure-adjusting device 98 and the spring 103 is so compressed as to withdraw the pin 110. Thereupon, the fluid pressure device 117 returns the valve plug to initial or exhaust position.

Referring to Figs. 1 and 15 of the drawing, the auxiliary exhaust valve 93 is shown connected to the exhaust port 89 of the main valve. Such auxiliary exhaust valve serves to permit a rapid exhaust of the fluid pressure contained within the main cylinder 4 until a predetermined pressure is obtained in the cylinder 4 and then to permit a very limited exhaust of the fluid pressure from such cylinder. By such means, the mold which is formed is insured against injury from a too rapid exhaust of the fluid pressure contained within the main pressure cylinder and a consequent rapid withdrawal of the mold from the pattern plate.

The valve 93 comprises a body portion 150 having an inlet 151, an outlet 152 and wall 153 having an opening therethrough which is controlled by a plug 154. A weight 155 is provided for holding the plug 154 in position and for determining the limit of the rapid exhaust of fluid pressure from the main cylinder. A relief opening 156 is provided in the wall 153 of the valve for permitting the exhaust of the fluid pressure from the main cylinder after the plug 154 has closed the main opening in the wall 153. Thus, when the main valve 70 is in the exhaust position, the fluid pressure from the main cylinder 4 raises the plug 154 to permit a rapid exhaust of the fluid pressure of such cylinder. However, when the fluid pressure has been lowered to a predetermined point, the weight on the plug 154 closes the main opening in the wall 153 and, thereafter, the fluid pressure in the cylinder 4 is exhausted at a limited rate through the relief opening 156.

Referring to Fig. 22 of the drawing, a latch 180 is pivotally supported on the bottom base plate 12. The latch 180 is operated manually and is adapted to engage the plunger plate 6. The latch 180 is mounted on the front of the base plate 12 in any convenient position and preferably, is located on the right-hand side of the center.

If so desired, the vibrator 61, which is mounted on the bottom pattern base plate 12, may be controlled manually, in any convenient manner. For example, the vibrator 61 may be controlled by any well-known knee valve.

Assuming the top pattern base plate 13 to be resting on the buffers 11, the latch 28 of the lever 27 to be in engagement with the catch 26, and the main valve 70 to be in the exhaust position, the operation of the molding machine is as follows: The top part 50 of the flask is mounted on the top pattern plate 15, and the bottom part of the flask 45 is mounted on the bottom pattern plate 14. Sand is then thrown into the two parts of the flask and the handle 30 and the trigger 29 of the lever 27 are grasped by the right hand to release the latch 28 from the catch 26. The lever 27 is given a small movement of rotation to jar the top pattern plate 15 and the top portion 50 of the flask on the buffers 11. By such means, the sand in the top portion of the flask is shaken into position.

The sand is scraped from the top of the two portions of the flask and the latch 180 is released to permit the bottom pattern plate and the bottom portion of the flask to assume a position approximately seventy-five degrees from horizontal.

The lever 27 is given a rotative movement in a counter-clockwise direction to swing the top pattern plate and the top portion of the flask and the lever 35 to such a position that the operator can grasp the lever 35 with his hand. The operator then manually continues this counter-clockwise rotation of the top pattern plate and the top portion of the flask till the sand in the top portion of the flask meets the sand in the bottom portion of the flask. The two pattern plates and the two portions of the flask are rotated to a horizontal position, as shown in Fig. 2 of the drawing. The T-shaped latch 41 of the lever 35 is engaged by the catch 42.

In the above-described movement, the top pattern plate is rotated through an angle of 180°. During the first 60° movement of such pattern plate, no movement of the plug 79 is effected. When the pattern plate 15 has rotated through 60°, the latch bolt 112 engages the pin 110 and, during the remaining 120° movement of the top pattern plate 15, the valve plug 79 is moved from the exhaust position to the inlet position shown in Figs. 4 and 7 of the drawing. The inlet position of the main valve is reached approximately when the T-shaped latch is fastened below the catch 42. Thereupon, fluid pressure is admitted from the main valve 70 through the pipe 91 to the main pressure cylinder 4.

The piston 5, which is attached to the piston plate 6, raises the bottom pattern plate 14 and compresses the flask members 45 and 50 between the pattern plates 14 and 15. The flask members 45 and 50 telescope with each other and thus maintain the impressions which are formed in the top and the bottom part of the flask level with the top edge and the bottom edge of such flask.

When the piston plate 6 has been raised a predetermined distance, the trip bar 64 engages the valve pin 68 to operate the vibrator valve 63. Such valve supplies fluid pressure to the vibrators 60 and 61 for vibrating the top and the bottom pattern plate.

Upon the admission of a predetermined fluid pressure to the main cylinder 4, the pressure-adjusting device, which is supplied with fluid pressure in accordance with the fluid pressure supplied to the main pressure cylinder 4, is operated. The spring member 103 is compressed and the pin 110 is withdrawn from the path of movement of the latch bolt 112.

Thereupon, the fluid pressure device 117, which is supplied with fluid pressure in accordance with the fluid pressure supplied to the cylinder 4, effects rotation of the valve plug 79 in a counter-clockwise direction to connect the exhaust port 89 of the main valve to the port 90, which is directly connected to the main pressure cylinder 4. The fluid pressure contained within the main pressure cylinder 4 is rapidly exhausted through the main valve 70 and the auxiliary exhaust valve 93.

When the fluid pressure in the main pressure cylinder is reduced to a predetermined value, the weight 155 on the stem of the auxiliary exhaust valve, closes the main opening in such valve and limits the rate of exhaust of the fluid pressure from the main pressure cylinder.

When the fluid pressure has been exhausted from the main pressure cylinder and the piston 5, carrying the bottom pattern base plate 14 and flask members 45 and 50, has returned to its original position, the latch 41 of the fulcrum lever 35 is released from the catch 42, and the top pattern plate 13 is rotated through 180° to position on the buffers 11. In such position, the latch 28 engages the top portion of the catch 26. A sprue is then cut in the sand in the usual manner and the flask is removed from the machine and the above operation is repeated.

The flasks are piled one upon another for multiple molding and, if so desired, may be piled adjacent to the molding machine and be carried away by a crane to the molding floor.

Modifications in the machine and in the arrangement and location of parts may be made within the spirit and scope of my invention, and such modifications are intended to be covered by the appended claims.

I claim as my invention:—

1. In a molding machine, the combination with two pattern plates, a two-part flask, means for mounting one part of said flask containing sand on each of said plates, and means for moving one plate and one part of the flask into position above the other part of the flask and the other plate, of means for simultaneously squeezing an impression in the sand at the top and the bottom of said flask while maintaining the plane of the perimeter of each impression coincident with the plane of the edge of the flask and varying the thickness of the sand in the flask.

2. In a molding machine, the combination with two pattern plates, a two-part flask, means for mounting one part of said flask containing sand on each of said plates, and means for moving one plate and one part of the flask into position above the other part of the flask and the other plate, of means for simultaneously impressing the sand in said flask between said plates to obtain impressions along the top edge and the bottom edge of the flask.

3. In a molding machine, the combination with a telescoping flask having a top and a bottom part, a top pattern plate and a bottom pattern plate, of means for mounting one part of the flask full of sand on each of said plates, means for moving the top plate and the associated part of the flask into position above the other part of the flask, and means for compressing the sand in said flask between the plates to obtain an impression in the top and bottom of the flask.

4. In a molding machine, the combination with a top and a bottom plate, a two-part flask, means for respectively mounting the two parts of the flask full of sand on the top and the bottom plate, and means for moving the top plate and the associated flask part into position above the other flask part, of means for compressing said flask between the plates to obtain an impression in the sand at the top and the bottom edge of said flask.

5. In a molding machine, the combination with a telescoping flask having a top and a bottom part, a top pattern plate and a bottom pattern plate, of means for mounting one part of the flask full of sand on each of said plates, means for moving the top plate and the associated part of the flask into position above the other part of the flask, and means for compressing the sand in said flask to obtain an impression at the top and the bottom of the flask, each of said impressions having a perimeter level with the edge of the flask.

6. In a molding machine, the combination with a telescoping flask having a top and a bottom part, a top pattern plate and a bottom plate, of means for mounting one part of the flask full of sand on each of said plates, means for moving the top plate and the associated part of the flask into position above the other part of the flask, and means for compressing the sand in said flask between said plates to obtain simultaneously two impressions, the thickness of the sand in said flask being variable.

7. In a molding machine, the combination with a top and a bottom plate, a two-part flask, means for respectively mounting the two parts of the flask full of sand on the top and the bottom plate, and means for moving the top plate and the associated flask part into position above the other flask part, of means for compressing the sand in said flask to simultaneously obtain an impression at the top and the bottom of said flask, each of said impressions having a perimeter level with the edge of the flask.

8. In a molding machine, the combination with a top and a bottom plate, a two-part flask, means for respectively mounting the two parts of the flask full of sand on the top and the bottom plate, and means for moving the top plate and the associated flask part into position above the other flask part, of means for compressing the sand in said flask between said plates to obtain simultaneously an impression at the top and the bottom edge of the flask, the thickness of the material in said flask being variable.

9. In a molding machine, the combination comprising a two-part telescoping flask containing molding material, two plates initially located in parallel planes and a part of said flask mounted on each of said plates, means, after sand is placed in each part of the flask, for permitting the swinging of each plate and the associated part of the flask to effect junction of the two parts of the flask in an approximately vertical plane, and means for compressing the material in the flask between the two plates to obtain an impression at the top and the bottom of the flask.

10. In a molding machine, the combination with a bottom plate, a pivotally mounted top plate, a flask located between said plates, and means comprising a main pressure cylinder for compressing the material in said flask between the two plates, of means comprising a main valve for automatically controlling the admission of fluid pressure to said pressure cylinder in accordance with the rotative position of said top plate.

11. In a molding machine, the combination with a top and a bottom plate, a flask located between said plates, and means comprising a pressure cylinder for compressing the material in said flask between said plates, of means comprising a valve for automatically controlling the admission of fluid pressure to said cylinder in accordance with the position of the top plate relative to the bottom plate.

12. In a molding machine, the combination with a top and a bottom plate, a flask located between said plates, and means for rotating said plates on the same axis, of means for automatically compressing the sand in said flask between the two plates when the top plate occupies a predetermined rotative position.

13. In a molding machine, the combination with a top and a bottom plate, a flask located between said plates, and means for compressing the material in said flask between said plates, of means for automatically controlling said compressing means in accordance with the rotative position of one of said plates.

14. In a molding machine, the combination with a top and a bottom plate, a flask located between said plates, and means comprising a pressure cylinder for compressing the sand in said flask between said plates, of means for automatically controlling the admission of fluid pressure to said cylinder in accordance with the relative position of said plates and for automatically exhausting the fluid pressure from said cylinder when a predetermined pressure has been applied to the sand in said flask.

15. In a molding machine, the combination with a top and a bottom plate, a flask located between said plates, and means comprising a pressure cylinder for compressing the sand in said flask between the two plates, of means for controlling the admission of fluid pressure to said cylinder in accordance with the relative position of said plates.

16. In a molding machine, the combination with two plates, a flask located between said plates, and means for compressing the sand in said flask between said plates, of means for automatically controlling said compressing means in accordance with the relative position of said plates, and means for automatically limiting the pressure applied to the sand between said plates.

17. In a molding machine, the combination comprising two plates, a flask located between said plates, and means for automatically compressing the material in said flask between the two plates in accordance with the rotative position of one of said plates.

18. In a molding machine, the combination comprising two plates, a flask located between said plates, means for automatically compressing the sand in said flask between the two plates in accordance with the rotative position of one of said plates, and means for automatically limiting the pressure applied to the sand between said plates.

19. In a molding machine, the combination with a top and a bottom plate, a flask located between said plates, and means comprising a pressure cylinder for automatically compressing the sand in said flask between the two plates in accordance with the rotative position of one of said plates, and means for vibrating each of said plates.

20. In a molding machine, the combination with a top and a bottom plate, a flask located between said plates, a pressure cylinder for compressing the sand in said flask between said plates, and means comprising a main valve for automatically admitting fluid pressure to said cylinder in accordance with the position of one of said plates, and for automatically releasing the fluid pressure from said cylinder after a predetermined compression, of auxiliary means for controlling the releasing of fluid pressure from said cylinder.

21. In a molding machine, the combination comprising two plates, a flask located between said plates, means for automatically compressing the sand in said flask between the plates in accordance with the position of one of said plates, vibrators associated with each of said plates, and means for automatically operating one of said vibrators upon a predetermined compression between said plates.

22. In a molding machine, the combination comprising two plates, a flask located between said plates, means for automatically compressing the sand in said flask between the plates in accordance with the position of one of said plates, means for automatically limiting the compression effected by said compressing means, vibrators associated with each of said plates, and means for automatically operating said vibrators upon a predetermined compression between said plates.

23. In a molding machine, the combination with a top and a bottom plate, a flask located between said plates, and means comprising a pressure cylinder for automatically compressing the sand in the flask between the plates in accordance with the position of one of said plates, of vibrators associated with said plates and means for operating said vibrators upon a predetermined compression between said plates.

24. In a molding machine, the combination with two plates, a flask located between said plates, and means for compressing the sand in said flask between said plates, of a vibrator associated with each of said plates, and means for automatically operating one of said vibrators upon a predetermined compression of the sand in said flask.

25. In a molding machine, the combination with two plates, a flask located between said plates, and automatic means for compressing the sand in said flask according to the relative position of said plates, of a vibrator associated with each of said plates, and means for automatically operating said vibrators upon a predetermined compression of the sand in said flask.

26. In a molding machine, the combination with two plates, a flask located between said plates, and means comprising a pressure cylinder for compressing the sand in said flask between the two plates, of a main valve for controlling the admission and release of fluid pressure to and from said pressure cylinder, and an auxiliary valve associated with said main valve for permitting a free and then a restricted exhaust of the fluid pressure from the pressure cylinder.

27. In a molding machine, the combination with two plates, a flask located between said plates, and means comprising a pressure cylinder for compressing the sand in said flask between the two plates, of a main valve for controlling the admission and exhaust of fluid pressure to and from said cylinder, and an auxiliary valve associated with the main valve for varying the rate of exhaust of the fluid pressure from said cylinder.

28. In a molding machine, the combination with two plates, a flask located between said plates, and means comprising a fluid pressure cylinder for compressing the sand in said flask between said plates, of automatic means for exhausting the fluid pressure from said cylinder at a rapid rate until a predetermined fluid pressure obtains in the cylinder and then for exhausting the fluid pressure at a relatively slow rate.

29. In a molding machine, the combination with two plates, a flask located between said plates, and means comprising a fluid pressure cylinder for compressing the sand in said flask between said plates, of automatic means for controlling the admission of fluid pressure to said cylinder in accordance with the rotative position of one of said plates and for exhausting the fluid pressure upon a predetermined pressure obtaining in said cylinder, and means for automatically varying the rate of exhausting the fluid pressure from said cylinder to prevent injury to the mold.

30. In a molding machine, the combination with a plate, a flask located adjacent to said plate, and means comprising a fluid pressure cylinder for obtaining an impression of said plate in the sand of said flask, of automatic means for varying the rate of exhaust of the fluid pressure from said cylinder to prevent injury to the mold.

31. In a molding machine, the combination with a plate, a flask located adjacent to said plate, and fluid pressure means for obtaining an impression of said plate in the sand of said flask, of automatic means for varying the rate of release of the pressure of said plate on the mold to prevent any injury to the impression formed.

32. In a molding machine, the combination with a top and a bottom plate, a flask located between said plates, a pivotal support means for rotating said top plate into position above the bottom plate, and means comprising a fluid pressure cylinder for compressing the sand in said flask between the plates, of a valve for controlling the admission and exhaust of fluid pressure to and from said cylinder, said valve being automatically controlled in accordance with the rotative position of said top plate.

33. In a molding machine, the combination with a top and a bottom plate, a flask located between said plates, pivotal supporting means for permitting rotation of the top plate into position above the bottom plate, and means comprising a fluid pressure cylinder for compressing the sand in said flask between the plates, of a valve for controlling the admission of fluid pressure to said cylinder in accordance with the rotative position of said top plate.

34. In a molding machine, the combination with a plate, a flask, pivotal support means for permitting rotation of the plate into position for obtaining an impression in the sand of said flask, and means comprising a fluid pressure cylinder for obtaining an impression of said plate in the sand of said flask, of a valve connected to a source of fluid pressure, and means for controlling said valve in accordance with the rotative position of said plate to admit fluid pressure to the cylinder.

35. In a molding machine, the combination with a plate, a flask, pivotal supporting means for permitting rotation of the plate into position for obtaining an impression in the sand of said flask, and means comprising a fluid pressure cylinder for obtaining an impression of said plate in the sand of said flask, of a valve connected to a source of fluid pressure, means for controlling said valve in accordance with the rotative position of said plate to admit fluid pressure to the cylinder, and means controlled in accordance with the fluid pressure in said cylinder for releasing the valve to exhaust the fluid pressure from said cylinder.

36. In a molding machine, the combination with a top and a bottom plate, a flask located between said plates, pivotal support means for permitting rotation of the top plate into position above the bottom plate, and means comprising a fluid pressure cylinder for compressing the sand in said flask between the plates, of a valve connected to a source of fluid pressure, means for controlling said valve in accordance with the rotative position of the top plate to admit fluid pressure to said cylinder, and means controlled in accordance with the fluid pressure in said cylinder for releasing said valve to exhaust the fluid pressure from the cylinder.

37. In a molding machine, the combination with a plate, a flask, pivotal supporting means for permitting rotation of the plate into position for obtaining an impression in the sand of said flask, and means comprising a fluid pressure cylinder for obtaining an impression of the plate in the sand of said flask, of a valve connected to a source of fluid pressure, means for rotating the plug of said valve in accordance with the rotative movement of said plate to admit fluid pressure to said cylinder, means operated in accordance with the fluid pressure in said cylinder for disconnecting the valve plug from the pattern plate, and means for returning the valve plug to initial position.

38. In a molding machine, the combination with a plate, a flask, pivotal supporting means for permitting rotation of the plate into position for obtaining an impression in the sand of said flask, and means comprising a fluid pressure cylinder for obtaining an impression of the plate in the sand of said flask, of a valve having a rotary plug and connected to a source of fluid pressure, a clutch for connecting said plug to the plate to admit fluid pressure to said cylinder in accordance with the rotative position of said plate, and automatic means for releasing said clutch upon obtaining a predetermined fluid pressure in said cylinder.

39. In a molding machine, the combination with a plate, a flask, pivotal supporting means for permitting rotation of the plate into position for obtaining an impression in the sand of said flask, and means comprising a fluid pressure cylinder for obtaining an impression of said plate in the sand of said flask, of a valve having a rotary plug and connected to a source of fluid pressure, a clutch for connecting said plug to the plate to admit fluid pressure to the cylinder in accordance with the rotative position of the plate, automatic means for releasing said clutch upon the obtaining of a predetermined fluid pressure in said cylinder and fluid pressure means for returning the plug to initial position.

40. In a molding machine, the combination with a flask having a top and a bottom member, and fluid pressure means for compressing said members to obtain an impression in the sand of said flask, of means comprising a valve for governing said compression means in accordance with the position of one of said members, and for limiting the pressure applied to said members.

41. In a fluid-pressure operating molding machine having a top member swung into position above a bottom member, the combination comprising a valve for supplying fluid pressure to the machine in accordance with the rotative position of the top member, and auxiliary means associated with said valve for exhausting the fluid pressure from said machine upon obtaining a predetermined pressure.

42. In a fluid-pressure operated molding machine, the combination comprising a valve having a plug movable in accordance with the operative position of the machine, means for biasing said plug to an initial position, and means for releasing said plug upon the supplying of a predetermined fluid pressure to the machine.

43. In a fluid-pressure operated molding machine, the combination comprising a valve having a plug movable in accordance with the operative position of the machine for controlling the fluid pressure supplied to the machine, fluid pressure means for biasing said plug to an initial position, and automatic means for releasing said plug upon the supplying of a predetermined fluid pressure to the machine.

44. In a fluid-pressure operated molding machine, the combination comprising a valve having a rotative plug for controlling the fluid pressure supplied to said machine, means for rotating said plug to admit fluid pressure to the machine, fluid pressure means for biasing said plug to an initial position and means automatically operated under certain fluid pressure conditions for releasing said plug to exhaust the fluid pressure from the machine.

45. In a fluid-pressure operated molding machine, the combination comprising a valve having a plug rotated in accordance with the operative position of said machine, fluid pressure means for biasing said plug to an initial position, and means for releasing said plug upon the supplying of a predetermined fluid pressure to the machine.

46. In a fluid-pressure operated molding machine, the combination comprising a valve operated in accordance with the operative position of the machine, means for biasing said valve to an initial position, and means for releasing said valve upon the supplying of a predetermined fluid pressure to the machine.

47. In a fluid-pressure operated molding machine, the combination comprising a valve operated in accordance with the operative position of the machine, and means controlled in accordance with the fluid pressure supplied to the machine for releasing said valve.

48. In a fluid-pressure operated molding machine, the combination comprising a valve having a plug rotated in accordance with the operative position of the machine, a fluid pressure device connected to said plug and supplied with fluid pressure by the valve for biasing the plug to initial position, and means for releasing the plug upon the supplying of a predetermined fluid pressure to the machine.

49. In a fluid-pressure operated molding machine, the combination comprising a valve having a plug rotated in accordance with the operative position of the machine, a fluid pressure device supplied with fluid pressure in accordance with the rotation of said plug and serving to bias the plug to an initial position, and means for releasing the plug upon the supplying of a predetermined fluid pressure to the machine.

50. In a fluid-pressure operated molding machine, a bottom member, a top member rotated into position above the bottom member, and means for automatically supplying fluid pressure to the machine in accordance with the rotative position of the top member.

51. In a fluid-pressure operated molding machine, a bottom member, a top member rotated into position above the bottom member, means for automatically supplying fluid pressure to the machine in accordance with the rotative position of the top member, and means for automatically exhausting the fluid pressure from the machine upon the obtaining of a predetermined fluid pressure in the machine.

In testimony whereof, I have hereunto subscribed my name this 16 day of May, 1921.

PAUL S. MENOUGH.